(12) United States Patent
Tsuchiya et al.

(10) Patent No.: US 8,914,179 B2
(45) Date of Patent: Dec. 16, 2014

(54) POWER TRANSMISSION DEVICE

(75) Inventors: Eiji Tsuchiya, Nisshin (JP); Takao Watanabe, Nagakute (JP); Shu Asami, Nagoya (JP); Tatsuya Miyano, Nagakute (JP); Akira Murakami, Gotenba (JP); Hiroyuki Ogawa, Susono (JP); Tomoyuki Toyama, Chita (JP)

(73) Assignees: Kabushiki Kaisha Toyota Chuo Kenkyusho, Nagakute (JP); Toyota Jidosha Kabushiki Kaisha, Toyota (JP); Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 14/007,082

(22) PCT Filed: Mar. 27, 2012

(86) PCT No.: PCT/JP2012/059119
§ 371 (c)(1),
(2), (4) Date: Sep. 30, 2013

(87) PCT Pub. No.: WO2012/133905
PCT Pub. Date: Oct. 4, 2012

(65) Prior Publication Data
US 2014/0028031 A1    Jan. 30, 2014

(30) Foreign Application Priority Data

Mar. 31, 2011    (JP) .................................. 2011-078532

(51) Int. Cl.
*B60K 6/00*    (2006.01)
*H02P 25/22*    (2006.01)
(Continued)

(52) U.S. Cl.
CPC . *H02P 25/22* (2013.01); *B60K 6/30* (2013.01); *B60K 6/448* (2013.01);
(Continued)

(58) Field of Classification Search
USPC ....................................................... 290/38 B
See application file for complete search history.

(56) References Cited

U.S. PATENT DOCUMENTS 4,533,011 A     8/1985  Heidemeyer et al.
5,508,574 A *   4/1996  Vlock ........................... 310/113
(Continued)

FOREIGN PATENT DOCUMENTS

DE     100 12 494 A1    9/2001
EP     2 179 879 A1     4/2010
(Continued)

OTHER PUBLICATIONS

International Search Report issued in International Patent Application No. PCT/JP2012/059119 dated Jul. 2, 2012.
(Continued)

*Primary Examiner* — Joseph Waks
(74) *Attorney, Agent, or Firm* — Oliff PLC

(57) ABSTRACT

During an inertial energy storage operation, electric power conversion at an inverter is controlled such that a direct current electric power from an electric power storage device is converted into an alternating current by the inverter so as to be supplied to stator windings, such that torque in the direction of engine rotation is applied to an output side rotor from a stator to rotatively drive the output side rotor in a state where power transmission from the output side rotor to a drive axle is stopped. During a cranking operation after the inertial energy storage operation, the electric power conversion at an inverter is controlled to permit application of the alternating current to rotor windings, such that a torque in the direction of engine rotation is applied to an input side rotor from the output side rotor, thereby rotatively driving an input side rotor to crank the engine.

6 Claims, 10 Drawing Sheets

(51) Int. Cl.
  *B60K 6/30*    (2007.10)
  *B60K 6/448*   (2007.10)
  *B60W 30/192*  (2012.01)
  *F02N 5/04*    (2006.01)
  *F02N 11/08*   (2006.01)
  *F02N 15/02*   (2006.01)
  *H02K 16/02*   (2006.01)
  *B60K 6/26*    (2007.10)
  *B60W 30/18*   (2012.01)
  *H02K 21/24*   (2006.01)
  *H02K 7/112*   (2006.01)
  *H02K 17/24*   (2006.01)

(52) U.S. Cl.
  CPC .............. *B60W 30/192* (2013.01); *F02N 5/04* (2013.01); *F02N 11/08* (2013.01); *F02N 15/02* (2013.01); *H02K 16/02* (2013.01); *B60K 2006/262* (2013.01); *B60K 2006/266* (2013.01); *B60W 30/18054* (2013.01); *F02N 2300/2002* (2013.01); *H02K 21/24* (2013.01); *H02K 7/112* (2013.01); *H02K 17/24* (2013.01); *Y02T 10/6243* (2013.01)
  USPC .............................................. 701/22; 310/80

(56) References Cited

U.S. PATENT DOCUMENTS

| | | | |
|---|---|---|---|
| 5,744,895 A | 4/1998 | Seguchi et al. | |
| 5,789,877 A | 8/1998 | Yamada et al. | |
| 5,804,934 A | 9/1998 | Yamada et al. | |
| 5,873,801 A | 2/1999 | Taga et al. | |
| 5,903,112 A | 5/1999 | Yamada et al. | |
| 5,903,113 A | 5/1999 | Yamada et al. | |
| 5,905,346 A | 5/1999 | Yamada et al. | |
| 5,909,094 A | 6/1999 | Yamada et al. | |
| 5,917,248 A | 6/1999 | Seguchi et al. | |
| 5,920,160 A | 7/1999 | Yamada et al. | |
| 5,942,862 A | 8/1999 | Yamada et al. | |
| 5,988,307 A | 11/1999 | Yamada et al. | |
| 6,440,036 B2 * | 8/2002 | Minowa et al. | 477/5 |
| 7,164,219 B2 * | 1/2007 | Hoeijmakers | 310/266 |
| 8,102,087 B2 * | 1/2012 | Yamamoto et al. | 310/83 |
| 8,620,508 B2 * | 12/2013 | Akutsu et al. | 701/22 |
| 8,647,230 B2 * | 2/2014 | Akutsu et al. | 477/4 |
| 8,666,579 B2 * | 3/2014 | Akutsu et al. | 701/22 |
| 8,710,785 B2 * | 4/2014 | Foster | 318/495 |
| 8,733,480 B2 * | 5/2014 | Watanabe et al. | 180/65.22 |
| 2006/0207811 A1 | 9/2006 | Miyao | |
| 2009/0020354 A1 | 1/2009 | Roth | |
| 2010/0048353 A1 | 2/2010 | Iwase et al. | |
| 2010/0219706 A1 | 9/2010 | Watanabe et al. | |

FOREIGN PATENT DOCUMENTS

| | | |
|---|---|---|
| JP | A-09-047093 | 2/1997 |
| JP | A-9-56010 | 2/1997 |
| JP | A-2002-089417 | 3/2002 |
| JP | A-2006-9751 | 1/2006 |
| JP | A-2009-73472 | 4/2009 |
| JP | A-2009-274536 | 11/2009 |

OTHER PUBLICATIONS

Aug. 5, 2014 Office Action issued in Japanese Patent Application No. 2011-078532 (with translation).

* cited by examiner

POWER TRANSMISSION DEVICE

TECHNICAL FIELD

The present invention generally relates to a power transmission device, and more particularly to a power transmission device capable of transmitting power from an engine to a drive axle using electromagnetic coupling of rotors.

BACKGROUND ART

A related art power transmission device of this type is disclosed in Patent Literature 1 below. The power transmission device according to Patent Literature 1 comprises a first rotor provided with a winding and mechanically connected to an engine, a second rotor provided with magnets that form an electromagnetic coupling with the first rotor winding and that is mechanically connected to the drive axle, a stator provided with a winding that forms an electromagnetic coupling with the second rotor magnets, a slip ring electrically connected to the first rotor winding, a brush that electrically contacts the slip ring, a first inverter that controls electric power exchangeably between the battery and the stator winding, and a second inverter that exchangeably controls electric power between the battery and the first rotor winding via the slip ring and the brush. According to Patent Literature 1, power from the engine transmitted to the first rotor is transmitted to the second rotor via the electromagnetic coupling of the first rotor winding and the second rotor magnets, thereby making it possible to drive the drive axle with the engine power. Further, since electric power is made exchangeable between the battery and the first rotor winding via the second inverter, the rotational speed of the drive axle can be controlled by controlling the electric power of the first rotor winding with the second inverter. In that case, when the rotational speed of the first rotor is higher than the rotational speed of the second rotor, electric power generated by the first rotor winding is supplied to the battery side via the second inverter, and when the rotational speed of the first rotor is lower than the rotational speed of the second rotor, the electric power of the battery is supplied to the first rotor winding via the second inverter. Further, due to the electromagnetic coupling of the stator winding and the second rotor magnets, power supplied to the stator winding from the battery side via the first inverter may be used to generate power in the second rotor to drive the drive axle, which then allows control of torque transmitted to the drive axle by controlling electric power supplied to the stator winding by the first inverter.

CITATION LIST

[Patent literature]

| | |
|---|---|
| [Patent Literature 1] | JP 9-56010 A |
| [Patent Literature 2] | JP 2006-9751 A |
| [Patent Literature 3] | JP 2009-73472 A |
| [Patent Literature 4] | JP 2009-274536 A |

SUMMARY OF THE INVENTION

Technical Problems

According to Patent Literature 1, in the case of starting an engine in a state where the drive axle is in a stopped state, the direct current electric power from the battery is converted into alternating current by the second inverter to be supplied to the first rotor winding via the slip ring and the brush, such that it becomes possible to rotatively drive the first rotor by the torque acting between the first rotor and the second rotor, therefore making it possible to crank the engine using the electric power supplied to the first rotor winding from the battery. However, when the electric power suppliable from the battery is low; for example, when the battery temperature is low or when the battery state of charge is insufficient, it is difficult to generate power required for cranking the engine in the first rotor using the electric power supplied to the first rotor winding from the battery, thereby making it difficult to start the engine.

According to Patent Literature 2, in the case where the battery state of charge is such that the engine cannot be started, a motor-generator is rotatively driven using the electric power of the battery in a state where the engine clutch is disengaged and the output shaft is fixed. Then, the engine clutch is engaged to start the engine using rotational inertia generated by the rotation of the motor-generator. However, energy loss due to slipping of the engine clutch is generated when the rotational energy of the motor-generator is transmitted to the engine via the engine clutch, creating greater loss, particularly at lower engine rotational speeds.

The present invention aims to efficiently start an engine even when the amount of electric power suppliable from an electric power storage device is small.

Solution to the Problems

The power transmission device according to the present invention has adopted means described below to accomplish the aim described above.

In summary, the power transmission device according to the present invention includes a first rotor, to which power from an engine is transmitted, and provided with a rotor conductor that can generate a rotating field by application of alternating current; a stator provided with a stator conductor that can generate a rotating field by application of alternating current; a second rotor relatively rotatable with respect to the first rotor, wherein torque acts between the first rotor and the second rotor in accordance with the action of the rotating field generated at the rotor conductor, and torque acts between the second rotor and the stator in accordance with the action of the rotating field generated at the stator conductor; a first electric power converter that converts electric power between an electric power storage device and the stator conductor; a second electric power converter that converts electric power between the rotor conductor and at least one of the electric power storage device and the first electric power converter; a power transmission/interruption mechanism that either permits or cuts off the power transmission from the second rotor to a drive axle; and a control unit that controls the electric power conversion at the first electric power converter to control the torque to be applied between the stator and the second rotor using the alternating current of the stator conductor, and that controls the electric power conversion at the second electric power converter to control the torque to be applied between the first rotor and the second rotor using the alternating current of the rotor conductor, wherein in the case of starting the engine in a state where the drive axle is at a stop the control unit implements an inertial energy storage operation for rotating the second rotor by applying torque to the second rotor from the stator using the alternating current of the stator conductor in a state where the power transmission from the second rotor to the drive axle is cut off by the power transmission/interruption mechanism; and a cranking operation for cranking the engine by rotating the first rotor by applying torque to the first rotor from the second rotor using the alternating current of the rotor conductor after the inertial energy storage operation.

In one aspect of the present invention, preferably, the control unit applies torque to the first rotor from the second rotor using the alternating current of the rotor conductor, and the torque is applied to the second rotor from the stator using the alternating current of the stator conductor during the cranking operation.

In another aspect of the present invention, preferably, the control unit controls the electric power conversion at the second electric power converter so as to recover electric power from the rotor conductor and apply torque to the first rotor from the second rotor using the alternating current of the rotor conductor, and the control unit controls the electric power conversion at the first electric power converter so as to supply electric power to the stator conductor to apply torque to the second rotor from the stator using the alternating current of the stator conductor, when a rotational speed of the second rotor is higher than a rotational speed of the first rotor during the cranking operation.

In yet another aspect of the present invention, preferably, the control unit controls the electric power conversion at the first electric power converter so as to recover electric power from the stator conductor and apply torque to the second rotor from the stator using the alternating current of the stator conductor, and the control unit controls the electric power conversion at the second electric power converter so as to supply electric power to the rotor conductor and apply torque to the first rotor from the second rotor using the alternating current of the rotor conductor when the rotational speed of the second rotor is lower than the rotational speed of the first rotor during the cranking operation.

In another aspect of the present invention, preferably, the control unit controls the torque to be applied to the first rotor from the second rotor using the alternating current of the rotor conductor and the torque to be applied to the second rotor from the stator using the alternating current of the stator conductor such that the difference between the electric power amount converted at the first electric power converter and the electric power amount converted at the second electric power converter is less than or equal to a set amount during the cranking operation.

In still another aspect of the present invention, preferably, the control unit implements the inertial energy storage operation and the cranking operation when it determines that the electric power amount suppliable from the electric power storage device is less than a required electric power amount when starting the engine with the drive axle in a stopped state.

Advantageous Effects of the Invention

According to the present invention, in the case of starting an engine in a state where a drive axle is at a stop, by storing the rotation energy in a second rotor in advance during an inertial energy storage operation and discharging this rotation energy of the second rotor and converting it into the power of a first rotor to be used for cranking the engine during a cranking operation, it is possible to efficiently start the engine even when the electric power amount suppliable from the electric power storage device is small.

DESCRIPTION OF EMBODIMENTS

Modes (hereinafter referred to as embodiments) for carrying out the present invention will be described hereinafter with reference to the drawings.

Figure 1:
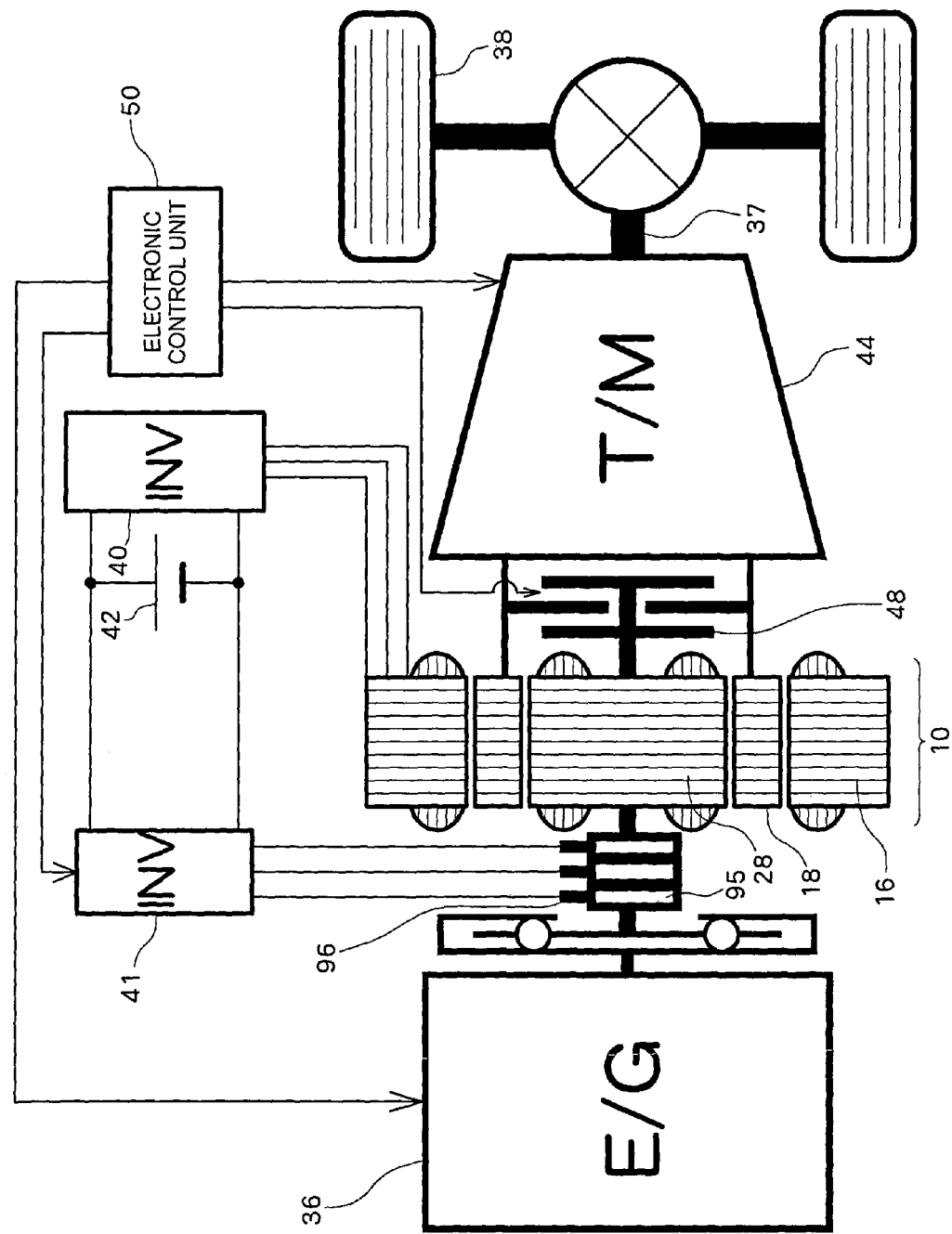
FIG. 1 shows a schematic configuration of a hybrid drive unit provided with a power transmission device according to an embodiment of the present invention.
Figure 2:
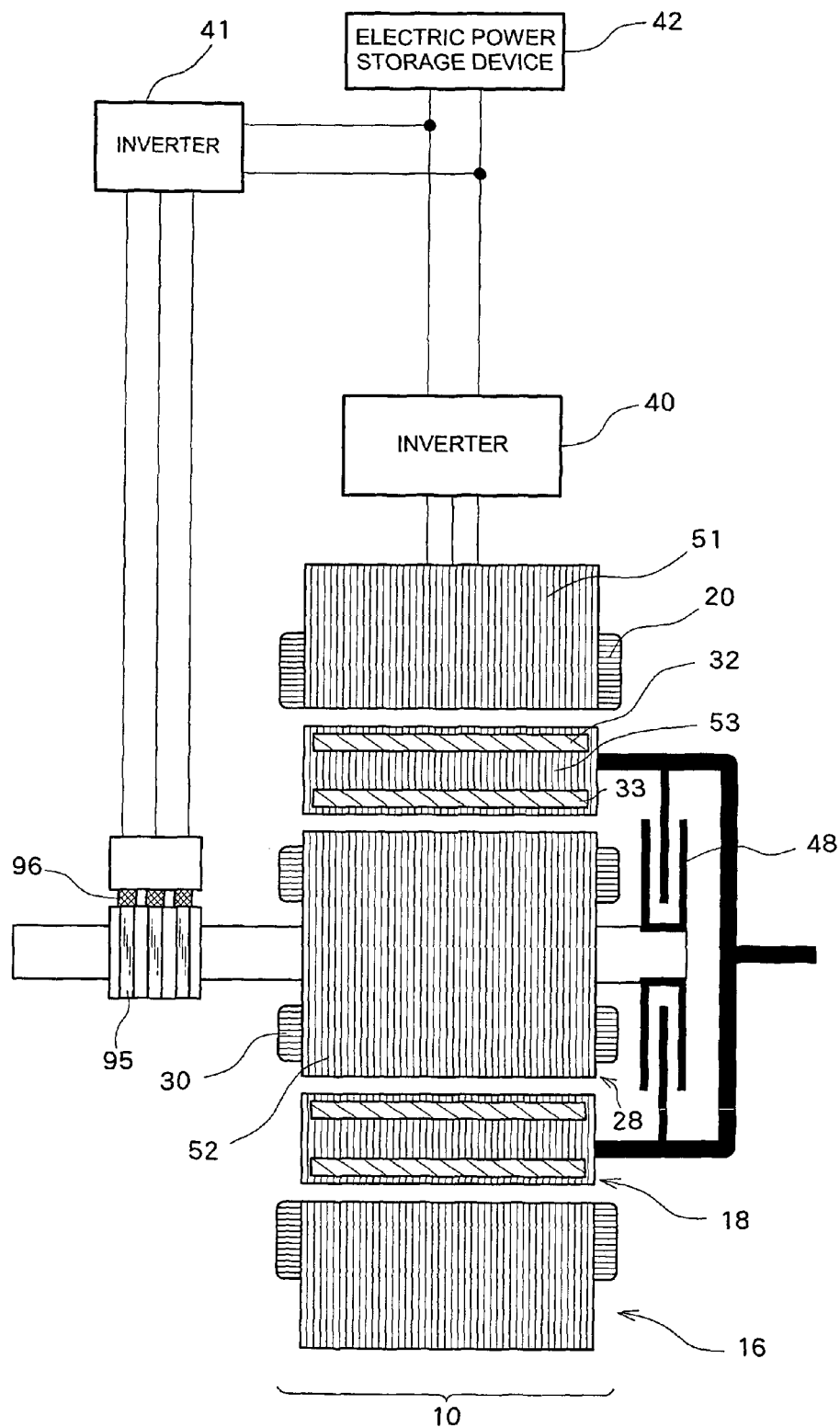
FIG. 2 shows a schematic configuration of a power transmission device according to the embodiment of the present invention.
Figure 3:
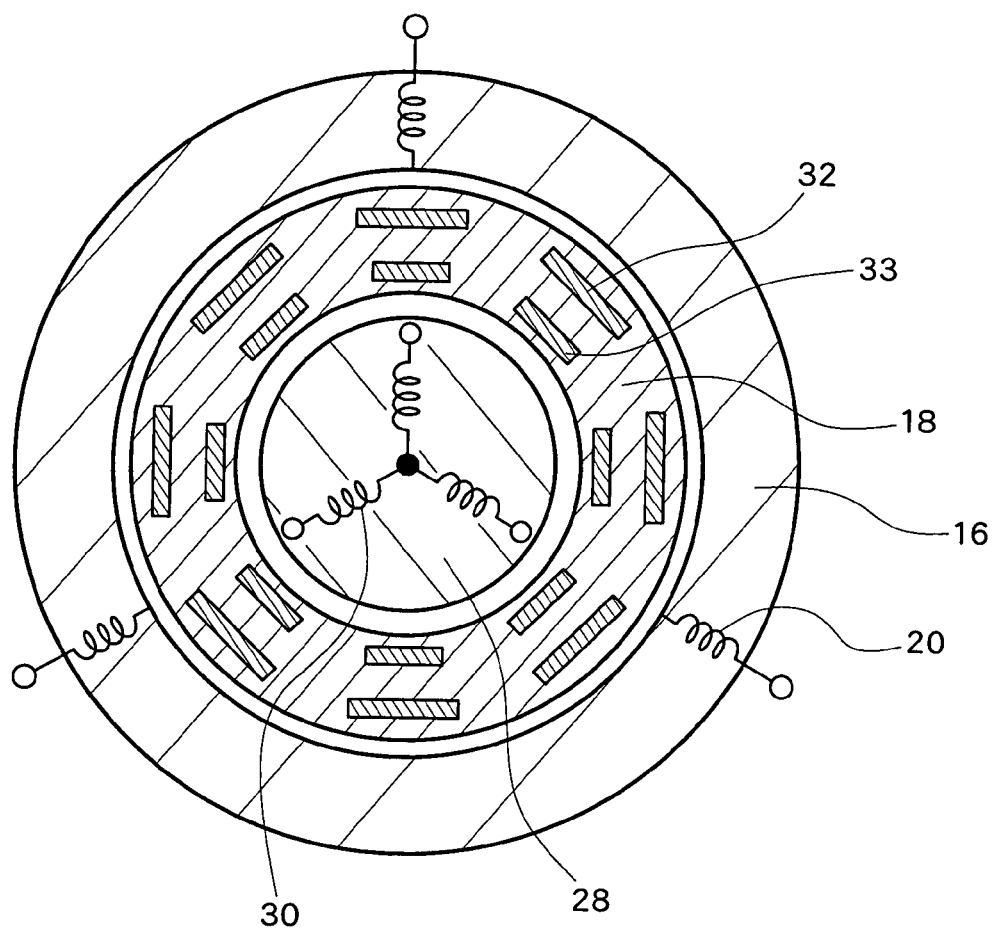
FIG. 3 shows a schematic configuration of a power transmission device according to the embodiment of the present invention.

FIGS. 1 through 3 are illustrations of a schematic configuration of a hybrid drive unit having a power transmission device according to an embodiment of the present invention, wherein FIG. 1 shows a schematic overall configuration and FIGS. 2 and 3 show schematic configurations of a rotating electric machine 10. A hybrid drive unit according to the present embodiment comprises an engine (internal combustion engine) 36 provided as a prime mover capable of generating power (mechanical power), a transmission (mechanical transmission) 44 provided between the engine 36 and a drive axle 37 (wheel 38) and capable of varying the change gear ratio, and the rotating electric machine 10 provided between the engine 36 and the transmission 44 and capable of generating power (mechanical power) and electricity. Further, the hybrid drive unit according to the present embodiment may be used as a power output device for driving, for example, a vehicle.

The rotating electric machine 10 comprises a stator 16 fixed to a stator case, not shown, a first rotor 28 that is relatively rotatable with respect to the stator 16, and a second rotor 18 that opposes the stator 16 and the first rotor 28 with predetermined gaps in the radial direction orthogonal to the rotor rotation axis and relatively rotatable with respect to the stator 16 and the first rotor 28. The stator 16 is located radially outward of the first rotor 28 with a gap therebetween, and the second rotor 18 is located between the stator 16 and the first rotor 28 in the radial direction. That is, the first rotor 28 is located radially inward of second rotor 18 and opposing the second rotor 18, and the stator 16 is located radial outward of the second rotor 18 and opposing the second rotor 18. The first rotor 28 is mechanically connected to the engine 36 such that power from the engine 36 is transmitted to the first rotor 28. Meanwhile, the second rotor 18 is mechanically connected to the drive axle 37 via the transmission 44 such that the power from the second rotor 18 is transmitted to the drive axle 37 (wheel 38) after changing speeds by the transmission 44. In the following description, the first rotor 28 will be referred to as an input side rotor and the second rotor 18 will be referred to as an output side rotor.

The input side rotor 28 includes a rotor core (a first rotor core) 52 and rotor windings 30 of a plurality of phases (three phases, for example) disposed in the rotor core 52 along a circumferential direction thereof. The rotor windings 30 can generate a rotating field that rotates in the circumferential direction of the rotor when alternating current of a plurality of phases (three phases, for example) is applied to the rotor windings 30 of a plurality of phases.

The stator 16 includes a stator core (stator core) 51 and stator windings 20 of a plurality of phases (three phases, for example) disposed in the stator core 51 along a circumferential direction thereof. The stator windings 20 of a plurality of phases (three phases, for example) can generate a rotating field in a circumferential direction of the stator when alternating current of a plurality of phases (three phases, for example) is applied to the stator windings 20 of a plurality of phases.

The output side rotor 18 includes a rotor core (second rotor core) 53 and permanent magnets 32, 33 disposed in the rotor core 53 along a circumferential direction thereof that generate a field magnetic flux. The permanent magnet 32 is disposed on an outer peripheral portion of the rotor core 53 so as to oppose the stator 16 (stator core 51) and the permanent magnet 33 is disposed on an inner peripheral portion of the rotor core 53 so as to oppose the input side rotor 28 (rotor core 52). Here, the permanent magnets 32, 33 may be integrated.

Figure 4:
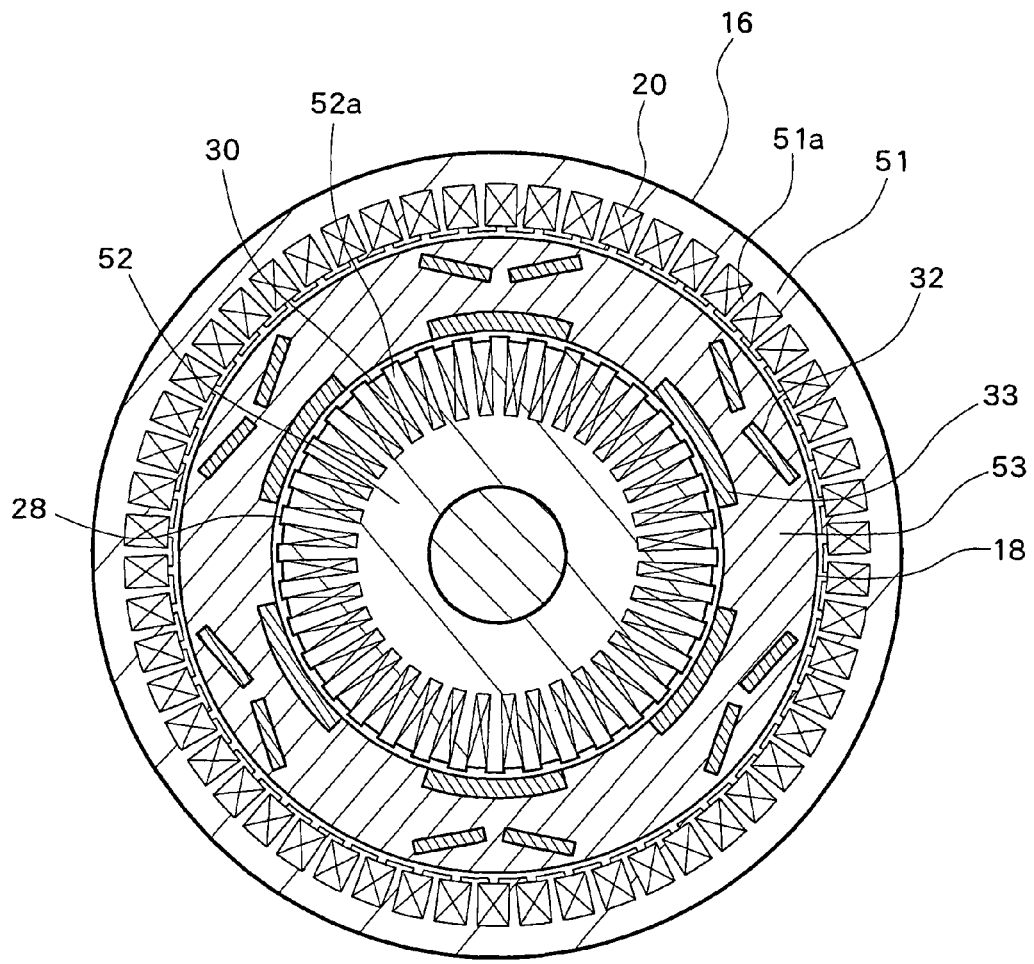
FIG. 4 is an illustration of an example of configuration of an input side rotor 28, an output side rotor 18, and a stator 16.

FIG. 4 shows an example configuration of the input side rotor 28, the output side rotor 18, and the stator 16 in detail. In the example shown in FIG. 4, the input side rotor 28, the output side rotor 18, and the stator 16 are disposed concentrically. The stator core 51 of the stator 16 has a plurality of teeth 51a that protrude radially inward (toward the output side rotor 18) and are arranged along the stator circumferential direction at fixed intervals. The respective stator windings 20 are wound around the teeth 51a to form magnetic poles. The rotor core 52 of the input side rotor 28 has a plurality of teeth 52a that protrude radially outward (toward the output side rotor 18) and are arranged along the rotor circumferential direction at fixed intervals. The respective rotor windings 30 are wound around the teeth 52a to form magnetic poles. The teeth 51a of the stator 16 and the permanent magnet 32 of the output side rotor 18 are disposed in the radial direction orthogonal to the rotation axis of the output side rotor 18 (coincides with the rotation axis of the input side rotor 28) opposing each other. The teeth 52a of the input side rotor 28 and the permanent magnet 33 of the output side rotor 18 are disposed in this radial direction opposing each other. A winding axis of the stator windings 20 and a winding axis of the rotor windings 30 coincide with this radial direction (in a direction in which the input side rotor 28 and the output side rotor 18 oppose each other). The permanent magnets 32, 33 are arranged along the rotor circumferential direction at fixed intervals, and further, the permanent magnets 32 are embedded in the rotor core 53 so as to form a V-shape. Here, the permanent magnets 32, 33 may either be exposed on a surface of the output side rotor 18 (on an outer peripheral surface or on an inner peripheral surface) or be embedded in the output side rotor 18 (in the rotor core 53).

A clutch 48 is disposed between the engine 36 and the transmission 44 so as to be parallel to the rotating electric machine 10 (the input side rotor 28 and the output side rotor 18). The mechanical engagement/disengagement of the input side rotor 28 and the output side rotor 18 may be selectively implemented by engagement/disengagement of the clutch 48. The input side rotor 28 and the output side rotor 18 rotate at equal rotational speeds integrally by engaging the clutch 48 and therefore mechanically engaging the input side rotor 28 and the output side rotor 18. On the other hand, a difference in the rotational speeds of the input side rotor 28 and the output side rotor 18 is permitted by disengaging the clutch 48 and canceling the mechanical engagement between the input side rotor 28 and the output side rotor 18. Here, the clutch 48 is capable of switching between engagement/disengagement using hydraulic pressure or electromagnetic force, for example, and further, it may also adjust the engagement force by adjusting the hydraulic pressure and electromagnetic force to be applied to the clutch 48.

A chargeable/dischargeable electric power storage device 42 provided as a direct current power source may be configured by a second battery, for example, to store electrical energy. An inverter 40 provided as a first electric power conversion device for converting electric power between the electric power storage device 42 and the stator windings 20 may be realized by a publicly known configuration including a switching element and a diode (rectifying device) connected inverse-parallelly with respect to the switching element, and the switching operation of the switching element allows conversion of the direct current electric power from the electric power storage device 42 into alternating current (a three-phase alternating current, for example) to be supplied to the respective phases of the stator windings 20. Further, the inverter 40 is also capable of electric power conversion in the direction in which the alternating current in the respective phases of the stator windings 20 is converted into direct current so as to be recovered by the electric power storage device 42. In this manner, the inverter 40 may implement bidirectional electric power conversion between the electric power storage device 42 and the stator windings 20.

A slip ring 95 is mechanically joined to the input side rotor 28, and is further connected electrically to the respective phases of the rotor windings 30. A brush 96, which is rotationally fixed, is pushed against the slip ring 95 to be in electrical contact therewith. The slip ring 95 rotates together with the input side rotor 28 while sliding against the brush 96 (while maintaining electrical contact with the brush 96). The brush 96 is electrically connected to an inverter 41. The inverter 41 provided as a second electric power conversion device for converting electric power between at least one of the electric power storage device 42 and the inverter 40 and the rotor windings 30 may be realized by a publicly know configuration including a switching element and a diode (rectifying device) connected inverse-parallelly with respect to the switching element, and the switching operation of the switching element allows to conversion of the direct current electric power from the electric power storage device 42 into alternating current (three-phase alternating current, for example) to be supplied to the respective phases of the rotor windings 30 via the brush 96 and the slip ring 95. Further, the inverter 41 is also capable of electric power conversion in the direction in which the alternating current in the respective phases of the rotor windings 30 is converted into direct current. At that time, the alternating current electric power is taken out from the slip ring 95 and the brush 96, and the alternating current electric power is converted into direct current by the inverter 41. Electric power converted into direct current by the inverter 41 may be converted into alternating current by the inverter 40 before being supplied to the respective phases of the stator windings 20. That is, the inverter 40 is capable of converting at least one of the direct current electric power from the inverter 41 and the direct current electric power from the electric power storage device 42 into alternating current and supplying it to the respective phases of the stator windings 20. Also, it is possible to recover the electric power converted into direct current by the inverter 41 by the electric power storage device 42. In this manner, the inverter 41 may implement bidirectional electric power conversion between at least one of the electric power storage device 42 and the inverter 40, and the rotor windings 30.

An electronic control unit 50 controls the switching operation of the switching element of the inverter 40 to control the electric power conversion by the inverter 40, thereby controlling the alternating current flowing in the respective phases of the stator windings 20. Further, the electric control unit 50 controls the switching operation of the switching element of the inverter 41 to control the electric power conversion by the inverter 41, thereby controlling the alternating current flowing in the respective phases of the rotor windings 30. Also, the electronic control unit 50 switches between engagement/disengagement of the clutch 48 to control switching between mechanical engagement/disengagement thereof between the input side rotor 28 and the output side rotor 18. Further, the electronic control unit 50 controls the operating state of the engine 36 and the change gear ratio of the transmission 44.

The switching operation of the inverter 40 causes alternating current of a plurality of phases (three phases, for example) to be applied to the stator windings 20 of a plurality of phases, which then causes the stator windings 20 to generate a rotating field that rotates in the circumferential direction of the stator. Torque (magnet torque) may be applied to the output side rotor 18 by the electromagnetic interaction (attraction/reaction) of the rotating field generated at the stator windings 20 and the field magnetic flux generated at the permanent magnets 32, which then rotatively drives the output side rotor 18. That is, electric power supplied to the stator windings 20 from the electric power storage device 42 via the inverter 40 may be converted into power (mechanical power) on the output side rotor 18, which then allows the stator 16 and the output side rotor 18 to function as a synchronous electric motor (PM motor portion). Further, it is possible to convert the power of the output side rotor 18 into electric power of the stator windings 20 to be recovered by the electric power storage device 42 via the inverter 40. In this way, since the stator windings 20 of the stator 16 and the permanent magnets 32 of the output side rotor 18 are electromagnetically coupled, the rotating field generated at the stator windings 20 may be caused to act on the output side rotor 18 so as to make torque (magnet torque) act between the stator 16 and the output side rotor 18. Further, as shown in FIG. 4, for example, in an example in which a magnetic substance (ferromagnetic substance) is disposed between the permanent magnets 32 as a protruded pole and opposing the stator 16 (teeth 51a), or in an example in which the permanent magnets 32 are embedded in the output side rotor 18 (inside the rotor core 53), reluctance torque also acts between the stator 16 and the output side rotor 18 in addition to the magnet torque in response to the rotating field generated at the stator 16 acting on the output side rotor 18. The electronic control unit 50 may control the torque acting between the stator 16 and the output side rotor 18 by controlling, for example, the amplitude and the phase angle of the alternating current supplied to the stator windings 20 by the switching operation of the inverter 40.

Also, as the input side rotor 28 rotates with respect to the output side rotor 18 and a difference in the rotational speeds is generated between the input side rotor 28 (rotor windings 30) and the output side rotor 18 (permanent magnet 33), an induced electromotive force is generated in the rotor windings 30, and this induced electromotive force causes an induced current (alternating electric current) to flow in the rotor windings 30, thereby generating a rotating field. Further, the electromagnetic interaction between the rotating field generated by the induced current of the rotor windings 30 and the magnetic flux of the permanent magnets 33 also allows torque to act on the output side rotor 18, thereby rotatively driving the output side rotor 18. In this way, since the rotor windings 30 of the input side rotor 28 and the permanent magnets 33 of the output side rotor 18 are electromagnetically coupled, torque (magnet torque) acts between the input side rotor 28 and the output side rotor 18 in response to the rotating field generated at the rotor windings 30 acting on the output side rotor 18. Accordingly, power (mechanical power) can be transmitted between the input side rotor 28 and the output side rotor 18, thereby causing the input side rotor 28 and the output side rotor 18 to act as an induced electromagnetic coupling portion.

When torque (electromagnetic coupling torque) is generated between the input side rotor 28 and the output side rotor 18 by the induced current of the rotor windings 30, the electronic control unit 50 implements the switching operation of the inverter 41 so as to allow an induced current flow in the rotor windings 30. At that time, the electronic control unit 50 may control the electromagnetic coupling torque acting between the input side rotor 28 and the output side rotor 18 by controlling the alternating current flowing in the rotor windings 30 with the switching operation of the inverter 41. On the other hand, when the electronic control unit 50 maintains the switching element of the inverter 41 in an off state to stop the switching operation, induced current will stop flowing in the rotor windings 30, which will then stop torque from acting between the input side rotor 28 and the output side rotor 18.

Operation of the hybrid drive unit according to the present embodiment will now be described.

When the engine 36 is generating power, the power of the engine 36 is transmitted to the input side rotor 28, and the input side rotor 28 is rotatively driven in the direction of engine rotation. An induced electromotive force is generated in the rotor windings 30 when the rotational speed of the input side rotor 28 becomes higher than the rotational speed of the output side rotor 18 in the state where the clutch 48 is disengaged. The electronic control unit 50 implements the switching operation of the inverter 41 so as to allow induced current to flow in the rotor windings 30. As a result, an electromagnetic coupling torque in the direction of engine rotation acts on the output side rotor 18 from the input side rotor 28 due to the electromagnetic interaction of the induced current of the rotor windings 30 and the magnetic flux of the permanent magnet 33, thereby rotatively driving the output side rotor 18 in the direction of engine rotation. In this way, power from the engine 36 transmitted to the input side rotor 28 is transmitted to the output side rotor 18 by the electromagnetic coupling of the rotor windings 30 of the input side rotor 28 and the permanent magnet 33 of the output side rotor 18. Power transmitted to the output side rotor 18 is then transmitted to the drive axle 37 (wheel 38) after changing speeds by the transmission 44 to be used for normal rotation driving of loads, such as forward driving of a vehicle. Accordingly, the wheel 38 can be rotatively driven in the normal rotation direction using the power from the engine 36, thereby driving the vehicle in the forward direction. Further, the engine 36 does not stall even when the rotation of the wheel 38 stops, since the rotation difference between the input side rotor 28 and the output side rotor 18 can be tolerated. As a result, the rotating electric machine 10 can function as a starting device, which eliminates the need for separately providing starting devices such as a friction clutch and a torque converter.

Further, alternating current electric power generated in the rotor windings 30 is taken out via the slip ring 95 and the brush 96. The alternating current electric power taken out is converted into direct current by the inverter 41. Then, the switching operation of the inverter 40 allows the direct current electric power from the inverter 41 to be converted into alternating current by the inverter 40 before being supplied to the stator windings 20 such that an alternating current flows in the stator windings 20 and a rotating field is formed at the stator 16. The electromagnetic interaction between the rotating field at this stator 16 and the field magnetic flux at the permanent magnet 32 of the output side rotor 18 also allows torque in the direction of engine rotation to act on the output side rotor 18. Accordingly, a torque amplifier function that amplifies torque in the direction of engine rotation at the output side rotor 18 can be realized. Also, it is possible to recover the direct current electric power from the inverter 41 by the electric power storage device 42.

Further, by controlling the switching operation of the inverter 40 such that the electric power is supplied from the electric power storage device 42 to the stator windings 20, the wheel 38 can be rotatively driven in the normal rotation direction using the power of the engine 36, and in addition, the rotative drive of the wheel 38 in the normal rotation direction may be assisted by the power of the output side rotor 18 generated using power supplied to the stator windings 20. Also, during deceleration driving of the loads, by controlling the switching operation of the inverter 40 with the electronic control unit 50 so as to recover electric power from the stator windings 20 by the electric power storage device 42, the power of the loads can be converted into an electric power of the stator windings 20 by the electromagnetic coupling between the stator windings 20 and the permanent magnet 32 to be recovered by the electric power storage device 42.

Also, by engaging the clutch 48 to mechanically join the input side rotor 28 and the output side rotor 18, the power from the engine 36 can be transmitted to the drive axle 37 (wheel 38) via the clutch 48 even without the torque acting between the input side rotor 28 and the output side rotor 18, due to the absence of alternating current in the rotor windings 30. Accordingly, it becomes possible to restrict joule loss generated by the induced current flowing in the rotor windings 30 accompanying the slip between the input side rotor 28 and the output side rotor 18.

Also, when implementing EV (Electric Vehicle) driving in which the load is driven (the wheel 38 is rotatively driven) using power of the rotating electric machine 10 without using the power of the engine 36, the electronic control unit 50 controls the switching operation of the inverter 40 to control driving of the load. For example, by controlling the switching operation of the inverter 40 by the electronic control unit 50 so as to convert the direct current electric power from the electric power storage device 42 into alternating current to be supplied to the stator windings 20, the power supplied to the stator windings 20 is converted into power of the output side rotor 18 through the electromagnetic coupling of the stator windings 20 and the permanent magnet 32, thereby rotatively driving the drive axle 37 (wheel 38). In this way, the wheel 38 can be rotatively driven by the power supplied to the stator windings 20 even when the engine 36 is not generating power. Further, when implementing EV driving, the clutch 48 is controlled to be in an engaged state.

Also, when starting the engine 36, the switching operation of the inverter 41 is controlled by the electronic control unit 50 so as to convert the direct current electric power from the electric power storage device 42 into alternating current by the inverter 41 so as to be supplied to the rotor windings 30 via the slip ring 95 and the brush 96, such that a torque in the direction of engine rotation acts on the input side rotor 28 from the output side rotor 18 with the alternating electric of the rotor windings 30. Accordingly, the power supplied from the electric power storage device 42 to the rotor windings 30 is used to rotate the input side rotor 28 in the direction of engine rotation, thereby implementing cranking of the engine 36. When cranking the engine 36, while torque acts on the input side rotor 28 connected to the engine 36 as a result of electromagnetic interaction between the rotating field at the input side rotor 28 and the field magnetic flux at the permanent magnet 33 of the output side rotor 18, the output side rotor 18 is also subjected to reaction torque in return. Accordingly, when starting the engine 36 while running in an EV mode, the switching operation of the inverter 40 is controlled such that electric power is supplied to the stator windings 20 from the electric power storage device 42 and a torque canceling this reaction torque is applied to the output side rotor 18, whereby the output side rotor 18 can be rotatively driven using the supplied electric power. When starting the engine 36, the clutch 48 is controlled to be in a disengaged state.

Figure 5:
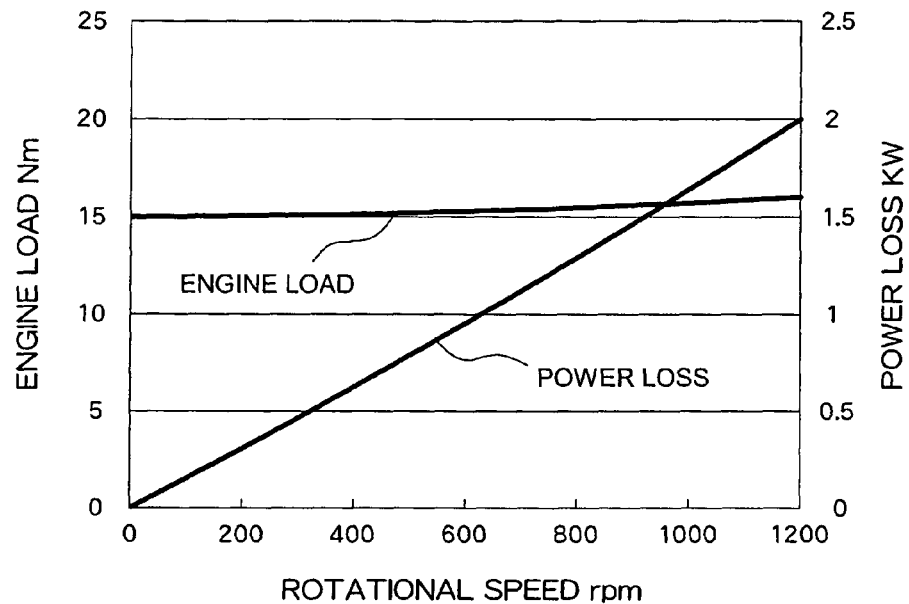
FIG. 5 is an illustration of a relationship between the rotational speed of the input side rotor 28 and the load and power loss of the engine 36 at the time of cranking the engine 36.
Figure 6:
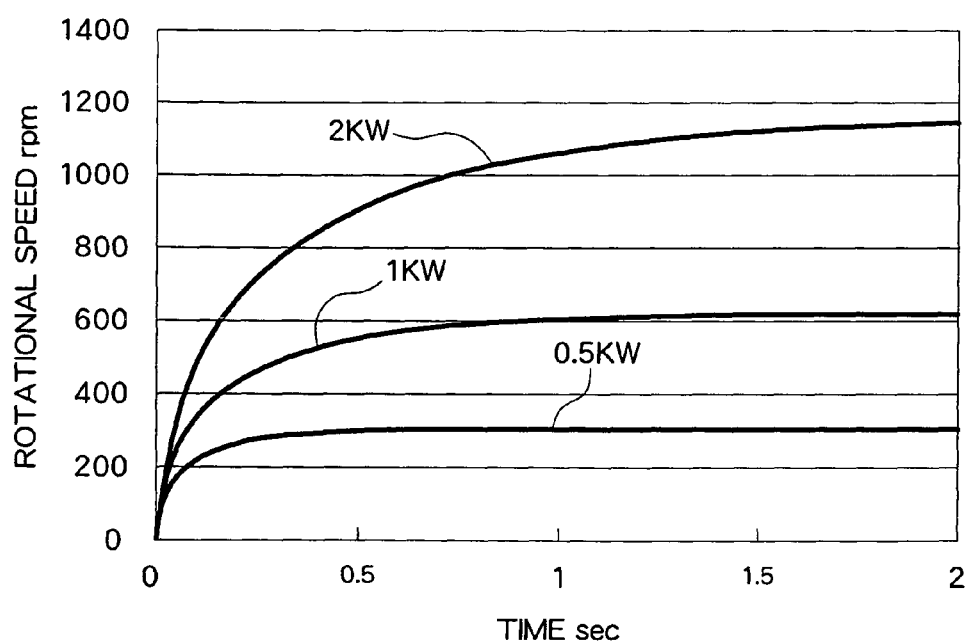
FIG. 6 is an illustration of a temporal change of the rotational speed of the input side rotor 28 against the supply power from an electric power storage device 42.

However, when starting the engine 36, in the case where electric power amount that can be output from the electric power storage device 42 is small such as when the temperature of the electric power storage device 42 is low or when the capacity of the electric power storage device 42 is small, for example, it would be difficult to generate power required for starting the engine 36 at the input side rotor 28 using the electric power supplied from the electric power storage device 42 to the rotor windings 30. Loads involved in cranking of the engine 36 include a constantly generated load and a load dependent on the rotational speed, and the power necessary for starting the engine 36 would be a product of these loads and the rotational speed, plus the acceleration energy. The relationship among the rotational speed of the input side rotor 28 (engine 36), the engine 36 load, and the power loss during cranking of the engine 36 is shown in FIG. 5, and the change of rotational speed of the input side rotor 28 (engine 36) over time with respect to the power supplied from the electric power storage device 42 is shown in FIG. 6. As shown in FIG. 5, the power loss increases as the rotational speed of the engine 36 during cranking increases. Also, as shown in FIG. 6, as the power supplied from the electric power storage device 42 decreases, the increaseable rotation of the engine 36 decreases as the supplied power from the electric power storage device 42 decreases, making it difficult to start the engine 36. An operation for starting the engine 36 in the case where suppliable electric power from the electric power storage device 42 is low will be described hereinafter.

Figure 7:
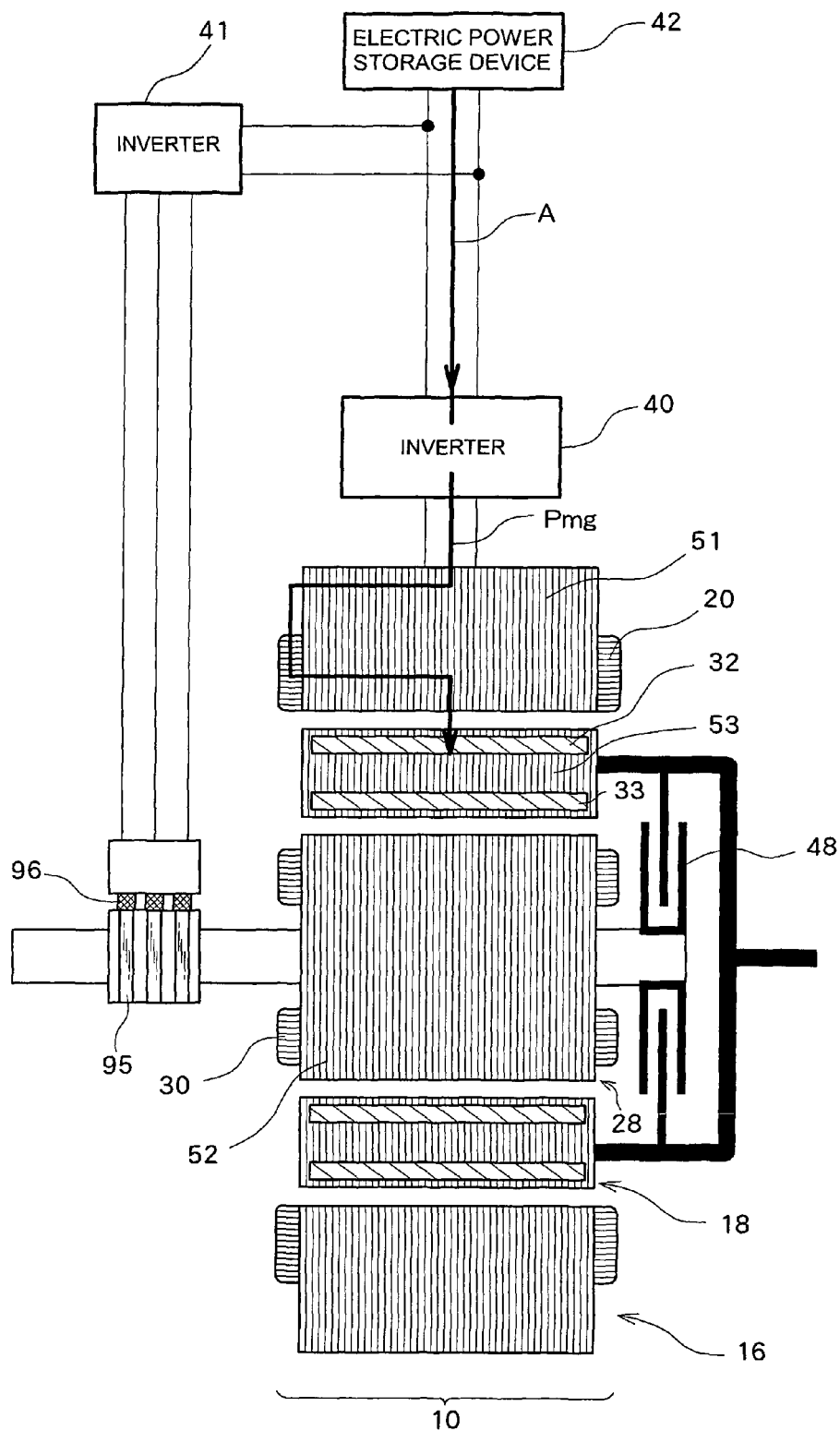
FIG. 7 is an illustration of a description of the power flow of inertial energy storage operation implemented when starting the engine 36.

When starting the engine 36 in the state where a vehicle is at a stop (the rotations of the drive axle 37 and the wheel 38 are at a stop), as shown by an arrow A in FIG. 7, the electric power conversion (switching operation) at the inverter 40 is controlled by the electronic control unit 50 so as to supply the direct current electric power from the electric power storage device 42 to the stator windings 20 after converting it into alternating current at the inverter 40 in a state where power transmission from the output side rotor 18 to the drive axle 37 (wheel 38) is shut off. Accordingly, a PM motor torque Tmg in the direction of the engine is applied to the output side rotor 18 from the stator 16 with the alternating current of the stator windings 20. Accordingly, the electric power Pmg supplied from the electric power storage device 42 to the stator windings 20 is used to rotate the output side rotor 18 in the direction of engine rotation so as to implement an inertial energy storage operation for storing inertial energy in the output side rotor 18 in advance. Since, unlike the engine 36, the output side rotor 18 has less load on rotation without the generation of pumping loss, acceleration of the output side rotor 18 is possible even when the electric power Pmg supplied to the stator windings 20 is limited to a predetermined amount or less (power amount less than or equal to what is suppliable from the electric power storage device 42), and the rotational speed Nmg of the output side rotor 18 gradually increases. An induced electromotive force is generated in the rotor windings 30 when the output side rotor 18 rotates with respect to the input side rotor 28.

In the case where the transmission is a stepped transmission such as an automatic transmission (AT) or an automatic-manual transmission (AMT), transmission of power from the output side rotor 18 to the drive axle 37 may be cut off by disengaging the engagement device for selecting a ratio of the transmission and rendering the transmission 44 in a neutral state. In that case, the transmission 44 functions as a power transmission/interruption mechanism for permitting or cutting off the transmission of power from the output side rotor 18 to the drive axle 37. If the transmission is a continuously variable transmission (CVT), transmission of power from the output side rotor 18 to the drive axle 37 may be cut off by providing a forward/reverse switching device between the output side rotor 18 and the input shaft of the transmission 44 or between the output shaft of the transmission and the drive axle 37 and disengaging the clutch and the brake of the forward/reverse switching device. In that case, the forward/reverse switching device functions as a power transmission/interruption mechanism for permitting or cutting off the transmission of power from the output side rotor 18 to the drive axis 37. Further, it is possible to provide a clutch between the output side rotor 18 and the input shaft of the transmission 44 or between the output shaft of the transmission 44 and the drive axle 37 to cut off the transmission of power from the output side rotor 18 to the drive axle 37 by disengagement of the clutch. In that case, the clutch functions as a power transmission/interruption mechanism for permitting or cutting off the transmission of power from the output side rotor 18 to the drive axle 37.

After implementing the inertial energy storage operation, the power conversion (switching operation) at the inverter 41 is controlled by the electronic control unit 50 so as to permit alternating current to flow in the rotor windings 30 in a state where the output side rotor 18 is rotating (in a state where the inertial energy is stored in the output side rotor 18), such that an electromagnetic coupling torque Tcoup in the direction of engine rotation acts on the input side rotor 28 from the output side rotor 18 using the alternating current in the rotor windings 30. Accordingly, the cranking operation for cranking the engine 36 by rotatively driving the input side rotor 28 in the direction of engine rotation using the inertial energy (rotation energy) of the output side rotor 18 is implemented. When converting the rotation energy stored in the output side rotor 18 in advance into the rotation energy of the input side rotor 28 (engine 36), power sufficiently larger than the power amount suppliable from the electric power storage device 42 may be supplied from the output side rotor 18 to the input side rotor 28 to be used for cranking the engine 36, power required for starting the engine 36 may be generated at the input side rotor 28 even when the power amount suppliable from the electric power storage device 42 is small. When the rotation energy of the output side rotor 18 is converted into the rotation energy of the input side rotor 28, the rotational speed Neng of the input side rotor 28 (engine 36) increases and the rotational speed Nmg of the output side rotor decreases.

Figure 8:
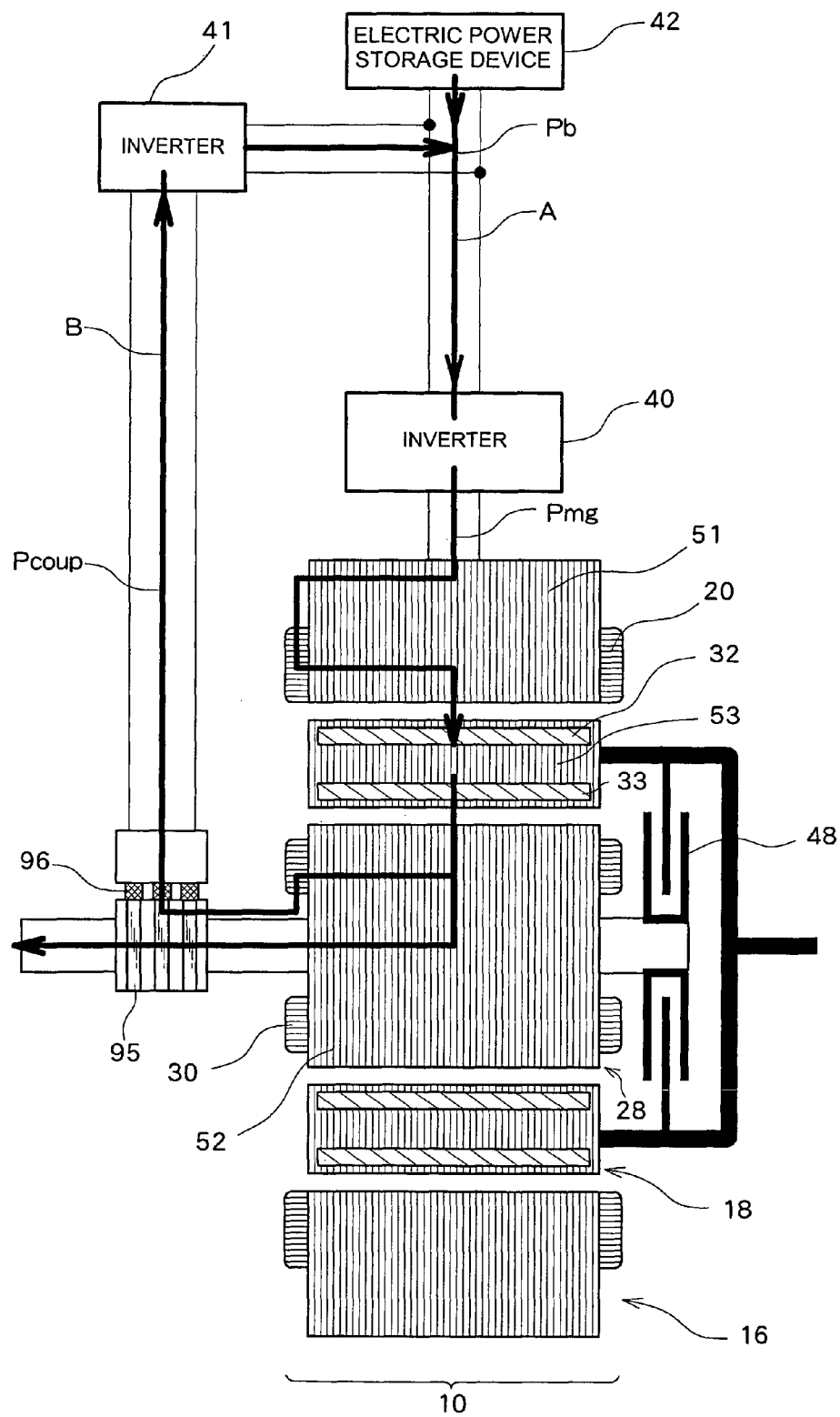
FIG. 8 is an illustration of a description of the power flow of cranking operation implemented when starting the engine 36.

In the cranking operation, when the rotational speed Nmg of the output side rotor 18 is higher than the rotational speed Neng of the input side rotor 28, the switching operation of the inverter 41 is controlled such that electric power is recovered from the rotor windings 30 via the slip ring 95 and the brush 96, as shown by an arrow B in FIG. 8, and the induced current of the rotor windings 30 generates the electromagnetic coupling torque Tcoup from the output side rotor 18 to the input side rotor 28. At that time, a part of the rotation energy of the output side rotor 18 is converted into generation power Pcoup of the rotor windings 30, and the alternating current power Pcoup taken out from the rotor windings 30 via the slip ring 95 and the brush 96 is converted into direct current at the inverter 41. Then, as shown by an arrow A in FIG. 8, by controlling the switching operation of the inverter 40 so as to convert the electric power Pcoup converted by the inverter 41 (electric power recovered from the rotor windings 30) from a direct current to an alternating current by the converter 40 and supplying it to the stator windings 20, PM motor torque Tmg in the direction of engine rotation can be applied to the output side rotor 18 from the stator 16 using the alternating current of the stator windings 20. Accordingly, when cranking the engine 36 by converting the rotation energy of the output side rotor 18 into a rotation energy of the input side rotor 28, the generated electric power Pcoup may be supplied to the stator windings 20 to be reused, thereby allowing restriction on the reduction of rotational speed Nmg (rotation energy) of the output side rotor 18.

Further, when conducting the switching operation of the inverter 40, not only the electric power Pcoup from the inverter 41 (rotor windings 30), but also the direct current electric power (Pb) from the electric power storage device 42 can be converted into alternating current by the inverter 40 to be supplied to the stator windings 20. As a result, in addition to the electric power supplied to the stator windings 20 from the rotor windings 30, electric power supplied to the stator windings 20 from the electric power storage device 42 may also be used to restrict the reduction of the rotation energy of the output side rotor 18. At that time, the electromagnetic coupling torque Tcoup and the PM motor torque Tmg are controlled such that the difference Pmg−Pcoup between the electric power amount converted by the inverter 40 (electric power amount supplied to the stator windings 20) and the electric power amount converted by the inverter 41 (electric power amount recovered from the rotor windings 30) is less than or equal to a predetermined value (less than or equal to the electric power amount suppliable from the electric power storage device 42). The electric power amount Pmg converted by the inverter 40 corresponds to the product Tmg×Nmg of the PM motor torque Tmg and the rotational speed Nmg of the output side rotor 18, and the electric power amount Pcoup converted by the inverter 41 corresponds to the product Tcoup×(Nmg−Neng) of the electromagnetic coupling torque Tcoup and the difference in rotational speed Nmg−Neng between the output side rotor 18 and the input side rotor 28. More particularly, the electromagnetic coupling torque Tcoup is controlled to be greater than or equal to a predetermined torque (greater than or equal to the override torque of the engine 36), and the PM motor torque Tmg is controlled based on the electromagnetic coupling torque Tcoup and the rotational speed Neng of the input side rotor 28, and the rotational speed Nmg of the output side rotor 18 such that the difference between the product Tmg×Nmg and the product Tcoup×(Nmg−Neng), Tmg×Nmg−Tcoup×(Nmg−Neng), can be covered by the supplied electric power Pb from the electric power storage device 42.

Figure 9:
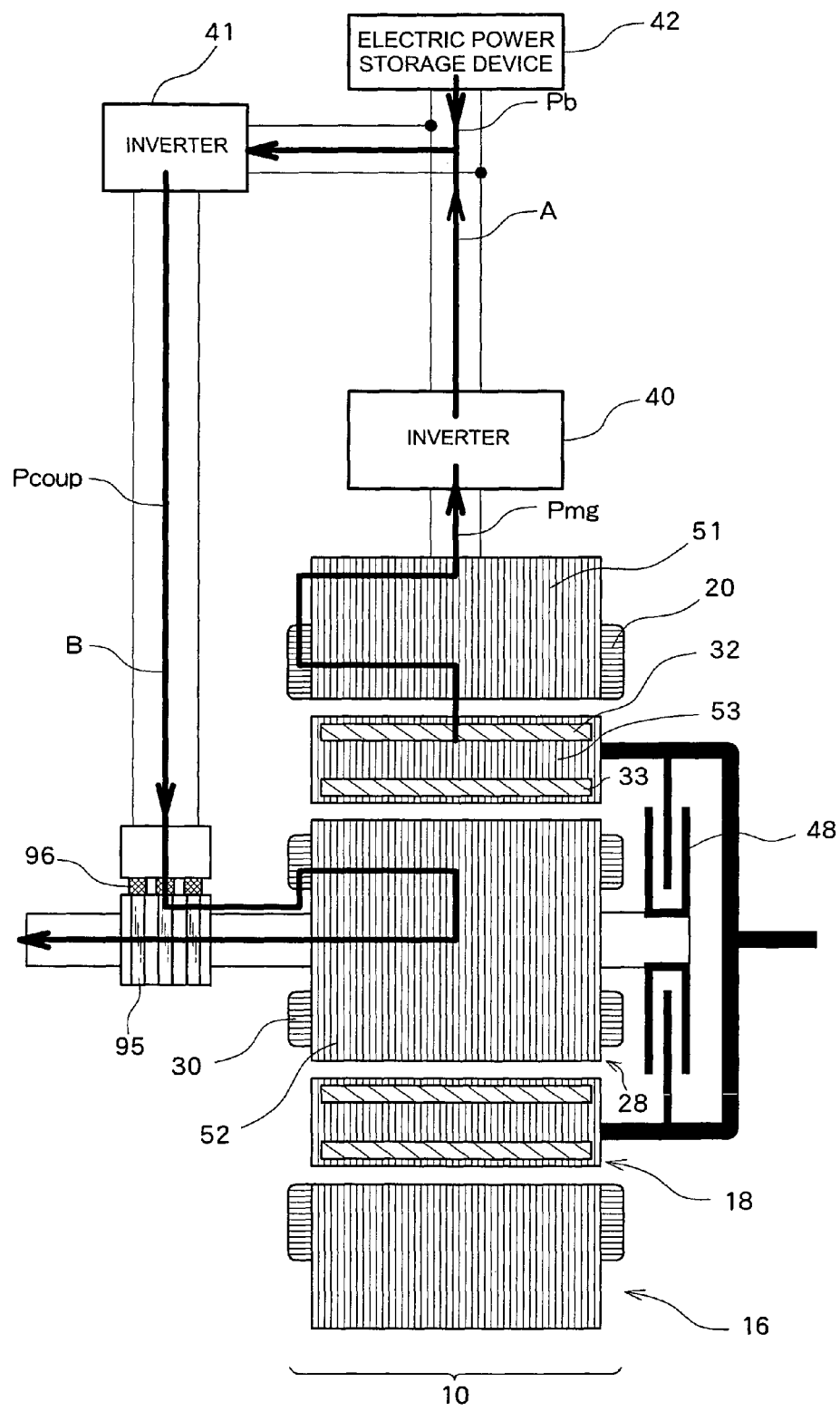
FIG. 9 is an illustration of a description of the power flow of cranking operation implemented when starting the engine 36.

Meanwhile, during the cranking operation, when the rotational speed Nmg of the output side rotor 18 becomes lower than the rotational speed Neng of the input side rotor 28 as a result of reduction in the rotational speed Nmg of the output side rotor 18 in accordance with the increase in rotational speed Neng of the input side rotor 28, the switching operation of the inverter 40 is controlled so as to recover electric power from the stator windings 20, as shown by an arrow A in FIG. 9, such that a PM motor torque Tmg in the direction opposite that of the engine rotation from the stator 16 to the output side rotor 18 with the alternating current of the stator windings 20. At that time, the rotation energy of the output side rotor 18 is converted into the alternating current electric power Pmg of the stator windings 20, and the alternating current electric power Pmg taken out from the stator windings 20 is converted into direct current by the inverter 40. Also, as shown by an arrow B in FIG. 9, the switching operation of the inverter 41 is controlled such that the electric power converted by the inverter 40 (electric power recovered from the stator windings 20) Pmg is converted from a direct current to an alternating current by the inverter 41 and is supplied to the rotor windings 30 via the brush 96 and the slip ring 95, and thereby an electromagnetic coupling torque Tcoup in the direction of rotation of the engine acts on the input side rotor 28 from the output side rotor 18 with the alternating current of the rotor windings 30. As a result, the input side rotor 28 is rotatively driven in the direction of engine rotation using the electric power supply from the stator windings 20 to the rotor windings 30.

Further, during switching operation of the inverter 41, not only the electric power Pmg from the inverter 40 (stator windings 20), but also the direct current electric power Pb from the electric power storage device 42 may be converted into alternating current by the inverter 41 to be supplied to the rotor windings 30. Accordingly, the input side rotor 28 can be rotatively driven in the direction of engine rotation using not only the power supply from the stator windings 20 to the rotor windings 30, but also the power supply from the electric power storage device 42 to the rotor windings 30. At that time, the electromagnetic coupling torque Tcoup and the PM motor torque Tmg are controlled such that the difference between the electric power amount converted by the inverter 41 (electric power amount supplied to the rotor windings 30) and the electric power amount converted by the inverter 40 (electric power recovered from the stator windings 20), Pcoup−Pmg, is less than or equal to a predetermined amount (less than or equal to the electric power amount suppliable from the electric power storage device 42). More particularly, the electromagnetic coupling torque Tcoup is controlled to be greater than or equal to a predetermined torque (greater than or equal to the override torque of the engine 36), and the PM motor torque Tmg is controlled based on the electromagnetic coupling torque Tcoup, the rotational speed Neng of the input side rotor 28, and the rotational speed Nmg of the output side rotor 18 such that the difference between the product Tcoup×(Nmg−Neng) and the product Tmg×Nmg, Tcoup×(Nmg−Neng)−Tmg×Nmg, can be covered by the supplied electric power Pb from the electric power storage device 42.

While the rotation energy of the output side rotor 18 useable for cranking the engine 36 becomes greater, the greater the rotational speed Nmg of the output side rotor 18 at the start of cranking operation (upon termination of the inertial energy storage operation), the greater the difference between the rotational speeds of the output side rotor 18 and the input side rotor 28, Nmg−Neg. Accordingly, the electric power of the rotor windings 30 (passing power of the inverter 41) may have to be restricted depending on the capacity of the inverter 41, leading to a smaller electromagnetic coupling torque Tcoup that can be generated at the input side rotor 28 from the output side rotor 18, and therefore decreasing the cranking torque of the engine 36. Therefore, it is preferable to maximize the rotational speed Nmg of the output side rotor 18 at the start of cranking operation within the range of rotational speed that can be accelerated by the electric power supplied from the electric power storage device 42, and under the conditions where (the electric power capacity of the inverter 41)/(the rotational speed Nmg of the output side rotor 18 at the start of cranking operation) is greater than or equal to a predetermined torque.

Figure 10A:
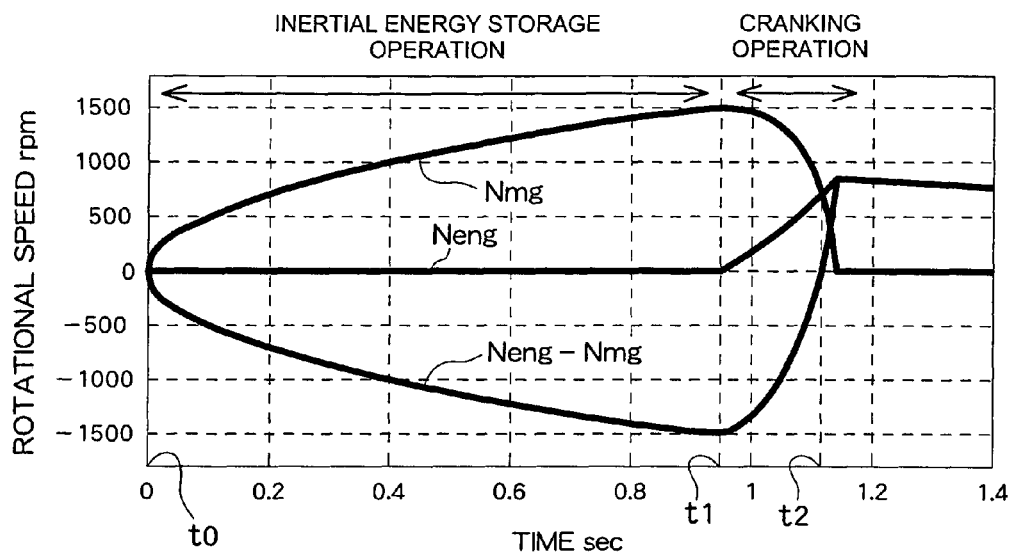
FIG. 10A is an illustration of a calculation result of an example engine start operation when executing the inertial energy storage operation and the cranking operation.
Figure 10B:
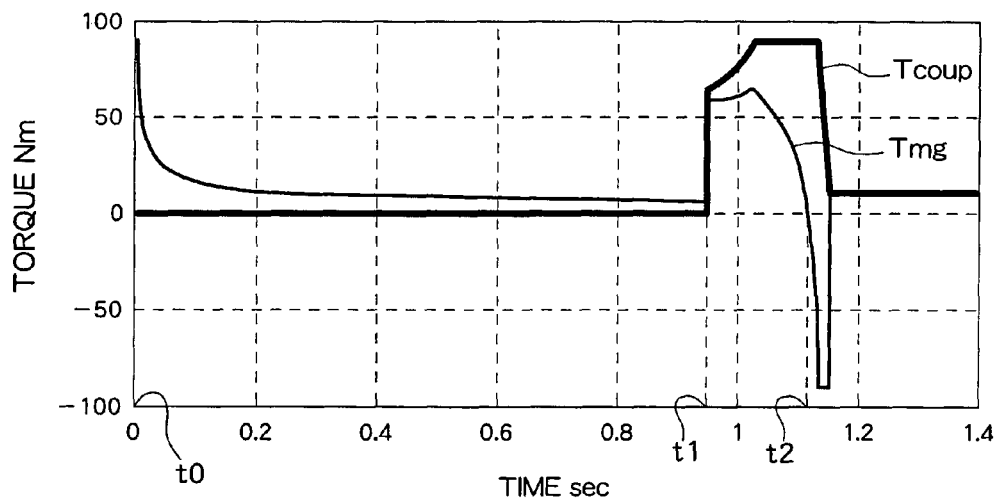
FIG. 10B is an illustration of a calculation result of an example of engine start operation when executing the inertial energy storage operation and the cranking operation.
Figure 10C:
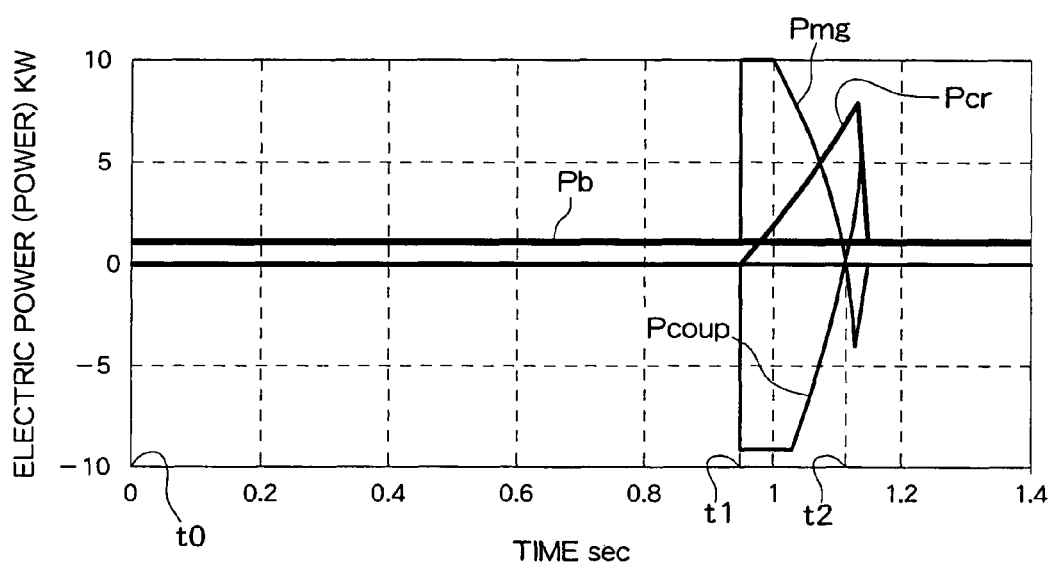
FIG. 10C is an illustration of a calculation result of an example of engine start operation when executing the inertial energy storage operation and the cranking operation.

FIGS. 10A, 10B, and 10C illustrate calculation results of an example of engine start operation when executing the inertial energy storage operation and the cranking operation. FIG. 10A shows the changes of the rotational speed Neng of the engine 36 (input side rotor) over time, the rotational speed Nmg of the output side rotor 18, and the rotational speed difference Neng−Nmg (the direction of engine rotation will be regarded as positive in all cases); FIG. 10B shows the changes of the PM motor torque Tmg over time that acts on the output side rotor 18 from the stator 16, and the electromagnetic coupling torque Tcoup that acts on the input side rotor 28 from the output side rotor 18 (the direction of engine rotation will be regarded as positive in both cases); and FIG. 10C shows changes of the electric power Pb of the electric power storage device 42 over time (discharge will be regarded as positive), the passing electric power Pmg of the inverter 40 (electric power supply to the stator windings 20 will be regarded as positive, and electric power recovery from the stator windings 20 will be regarded as negative), the passing electric power Pcoup of the inverter 41 (electric power supply to the rotor windings 30 will be regarded as positive, and electric power recovery from the rotor windings 30 will be regarded as negative), and the cranking power Pcr (=Tcoup× Neng). During calculation, the friction torque of the engine 36 had been set to 15 Nm, the friction torque of the output side rotor 18 to 1 Nm, the moment of inertia of the engine 36 to 0.1 kg·m², the moment of inertia of the input side rotor 28 to 0.04 kg·m², the moment of inertia of the output side rotor 18 to 0.06 kg·m², and the capacities of the inverters 40, 41 (maximum electric power that can be converted) had been limited to 10 kW, and the capacity of the electric power storage device 42 (suppliable maximum electric power) to 1 kW.

In FIG. 10A, rotations of the engine 36, the input side rotor 28, the output side rotor 18, and the drive axle 37 are stopped before starting the engine 36. When a command to start the engine 36 is output at time t0, implementation of the inertial energy storage operation is started. In the examples shown in FIGS. 10A, 10B, and 10C, the output side rotor 18 is accelerated while limiting the power supply (passing electric power of the inverter 40) from the electric power storage device 42 to the stator windings 20 to a constant value (1 kW) during the inertial energy storage operation, and the PM motor torque Tmg is reduced in response to the increase of the rotational speed Nmg of the output side rotor 18. When the rotational speed Nmg of the output side rotor 18 rises to a set speed (1500 rpm in the example shown in FIG. 10A), the implementation of the inertial energy storage operation is terminated and the implementation of the cranking operation is started. In the examples shown FIGS. 10A, 10B, and 10C, after time t1, the electric power supply Pb from the electric power storage device 42 is limited to a constant value (1 kW) while limiting the passing electric power Pmg, Pcoup of the inverters 40, 41 to a predetermined value or less (10 kW or less). At the same time, an electromagnetic coupling torque Tcoup in the direction of engine rotation acts on the input side rotor 28 from the output side rotor 18 using the induced current of the rotor windings 30, and electric power is supplied to the stator windings 20 from the rotor windings 30 via the inverter 41, 40 so as to make a PM motor torque Tmg in the direction of engine rotation act on the output side rotor 18 from the stator 16 using the alternating current of the stator windings 20. At that time, the electromagnetic coupling torque Tcoup is greater than the PM motor torque Tmg, the rotational speed Neng of the engine 36 increases, and the rotational speed Nmg of the output side rotor 18 decreases. After time t2, when the rotational speed Neng of the engine 36 becomes higher than the rotational speed Nmg of the output side rotor 18, the alternating current of the stator windings 20 is used to make a PM motor torque Tmg in the direction opposite that of the engine rotation act on the output side rotor from the stator 16. At the same time, electric power is supplied to the rotor windings 30 from the stator windings 20 via the inverters 40, 41 so as to make the electromagnetic coupling torque Tcoup in the direction of engine rotation act on the input side rotor 28 from the output side rotor 18 using the alternating current of the rotor windings 30. As shown in FIGS. 10A, 10B, and 10C, it is apparent that rotational speed Neng of the engine 36 can be raised up to approximately 900 rpm and therefore starting the engine 36 is possible by implementation of the inertial energy storage operation and the cranking operation even when the capacity (electric power amount supplied) of the electric power storage device 42 is limited to 1 kW.

According to the present embodiment described above, in the case of starting the engine 36 in a state where rotation of the drive axle 37 and that of the wheel 38 are stopped, storing the rotation energy in the output side rotor 18 in advance using electric power Pm supplied to the stator windings 20 from the electric power storage device 42 and discharging this rotation energy of the output side rotor 18 to be used for cranking the engine 36 enables transmission of power required for starting the engine 36 to the engine 36 even when the electric power amount suppliable from the electric power storage device 42 is small. Further, a part of the rotation energy of the output side rotor 18 is converted into a generation power of the rotor windings 30 when cranking the engine 36 by discharging the rotation energy of the output side rotor 18; however, the generation power of the rotor windings 30 may be supplied to the stator windings 20 via the inverters 41, 40 so as to rotatively drive the output side rotor 18, thereby making it possible to recycle energy. Accordingly, loss generated upon conversion of the rotation energy of the output side rotor 18 into the cranking power of the engine 36 can be reduced; particularly, losses generated at low rotational speeds Neng of the engine 36 can be reduced. Therefore, it is possible to efficiently start the engine 36 using rotation energy of the output side rotor 18.

Also, if the power required for starting the engine 36 is suppliable from the electric power storage device 42, the engine 36 can be started without necessarily executing the inertial energy storage operation and the cranking operation. Therefore, it is also possible to start the engine 36 such that the engine 36 is started by implementation of the inertial energy storage operation and the cranking operation when it is determined by the electronic control unit 50 that the electric power amount suppliable from the electric power storage device 42 is less than the electric power amount required for starting the engine 36, and to start the engine 36 by controlling the switching of the inverter 41 such that the direct current electric power from the electric power storage device 42 is converted into an alternating current by the inverter 41 to be supplied to the rotor windings 30 via the slip ring 95 and the brush 96 when it is determined by the electronic control unit 50 that the electric power amount suppliable from the electric power storage device 42 is greater than or equal to the electric power amount required for starting the engine 36. At that time, electric power amount suppliable from the electric power storage device 42 changes depending on the temperature of the electric power storage device 42, and particularly at low temperatures, the electric power amount suppliable from the electric power storage device 42 decreases. Therefore, it is possible to estimate the electric power amount suppliable from the electric power storage device 42 in accordance with the temperature of the electric power storage device 42; that is, it is possible to determine that the electric power amount suppliable from the electric power storage device 42 is less than the electric power amount required for starting the engine 36 when the temperature of the electric power storage device 42 is lower than a set temperature. Also, it is possible to estimate the electric power amount suppliable from the electric power storage device 42 based on the current and voltage of the electric power storage device 42 during driving of the inverter 40 (or the inverter 41). Further, in the present embodiment, the engine 36 can be started even when the capacity of the electric power storage device 42 is set to be lower than the power required for starting the engine 36, and in that case, the engine 36 is started by implementation of the inertial energy storage operation and the cranking operation.

The mode for carrying out the present invention has been heretofore described; however, the present invention is not limited to such embodiment, whatsoever, and it is obvious that the invention can be carried out in various modes without departing from the scope of the invention.

REFERENCES SYMBOLS LIST

10 Rotating electric machine, 16 Stator, 18 Second rotor (output side rotor), 20 Stator windings 28 First rotor (input side rotor), 30 Rotor windings, 32, 33 Permanent magnet, 36 Engine, 37 Drive axle, 38 Wheel, 40, 41 Inverter, 42 Electric power storage device, 44 Transmission, 48 Clutch, 50 Electronic control unit, 95 Slip ring, 96 Brush

The invention claimed is:
1. A power transmission device, comprising:
a first rotor, to which power from an engine is transmitted, and provided with a rotor conductor that can generate a rotating field by application of an alternating current;
a stator provided with a stator conductor that can generate a rotating field by application of an alternating current;
a second rotor relatively rotatable with respect to the first rotor, wherein torque acts between the first rotor and the second rotor in accordance with the action of the rotating field generated at the rotor conductor, and torque acts between the second rotor and the stator in accordance with the action of the rotating field generated at the stator conductor;
a first electric power converter that converts electric power between an electric power storage device and the stator conductor;
a second electric power converter that converts electric power between the rotor conductor and at least one of the electric power storage device and the first electric power converter;

a power transmission/interruption mechanism that either permits or cuts off the power transmission from the second rotor to a drive axle; and a control unit that controls the electric power conversion at the first electric power converter to control the torque to be applied between the stator and the second rotor using the alternating current of the stator conductor, and that controls the electric power conversion at the second electric power converter to control the torque to be applied between the first rotor and the second rotor using the alternating current of the rotor conductor, wherein in the case of starting the engine in a state where the drive axle is at a stop the control unit implements an inertial energy storage operation for rotating the second rotor by applying torque to the second rotor from the stator using the alternating current of the stator conductor in a state where the power transmission from the second rotor to the drive axle is cut off by the power transmission/interruption mechanism; and a cranking operation for cranking the engine by rotating the first rotor by applying torque to the first rotor from the second rotor using the alternating current of the rotor conductor after the inertial energy storage operation.

2. The power transmission device according to claim 1, wherein the control unit applies torque to the first rotor from the second rotor using the alternating current of the rotor conductor, and the torque is applied to the second rotor from the stator using the alternating current of the stator conductor during the cranking operation.

3. The power transmission device according to claim 2, wherein the control unit controls the electric power conversion at the second electric power converter so as to recover electric power from the rotor conductor and apply torque to the first rotor from the second rotor using the alternating current of the rotor conductor, and the control unit controls the electric power conversion at the first electric power converter so as to supply electric power to the stator conductor to apply torque to the second rotor from the stator using the alternating current of the stator conductor, when a rotational speed of the second rotor is higher than a rotational speed of the first rotor during the cranking operation.

4. The power transmission device according to claim 2, wherein the control unit controls the electric power conversion at the first electric power converter so as to recover electric power from the stator conductor and apply torque to the second rotor from the stator using the alternating current of the stator conductor, and the control unit controls the electric power conversion at the second electric power converter so as to supply electric power to the rotor conductor and apply torque to the first rotor from the second rotor using the alternating current of the rotor conductor when the rotational speed of the second rotor is lower than the rotational speed of the first rotor during the cranking operation.

5. The power transmission device according to claim 2, wherein the control unit controls the torque to be applied to the first rotor from the second rotor using the alternating current of the rotor conductor and the torque to be applied to the second rotor from the stator using the alternating current of the stator conductor such that the difference between the electric power amount converted at the first electric power converter and the electric power amount converted at the second electric power converter is less than or equal to a set amount during the cranking operation.

6. The power transmission device according to claim 1, wherein the control unit implements the inertial energy storage operation and the cranking operation when it determines that the electric power amount suppliable from the electric power storage device is less than a required electric power amount when starting the engine with the drive axle in a stopped state.

* * * * *